April 23, 1935.  L. BERTELE  1,998,704
PHOTOGRAPHIC OBJECTIVE
Filed Aug. 31, 1932

INVENTOR
Ludwig Bertele
BY
George C. Heinrich
ATTORNEY

Patented Apr. 23, 1935

1,998,704

UNITED STATES PATENT OFFICE 1,998,704

PHOTOGRAPHIC OBJECTIVE

Ludwig Bertele, Dresden-A, Germany, assignor to Zeiss Ikon Aktiengesellschaft Dresden, Dresden, Germany Application August 31, 1932, Serial No. 631,222
In Germany September 1, 1931

1 Claim. (Cl. 88—57)

This invention relates to improvements in objective systems as they are for instance described in the application Serial No. 470,207, in which the system in its application to a large field of vision shows disturbing comatic phenomena. Particularly the upper comatic bunches, show a strongly positive supercorrection or rectification. Experiments have shown, that these phenomena can be remedied by the introduction of a collecting cemented face into the last member of the sytem, if with a difference in the refractory members of more than 0,1, the curvature of the cemented face is so arranged as to present its hollowed side to the picture.

It is the object of my invention to provide an objective system consisting of two collecting members on air and in which these members surround another meniscus-shaped system member, and the first collecting system element in connection with the convex outer face of the surrounded system element facing the first system element, has a focal distance measured in the medium glass, which is smaller than the total focal distance of the objective, with a collecting cement face in the last member of the objective system which has its hollow face turned towards the picture.

These and other objects and advantages of my invention will become more fully known as the description thereof proceeds, and will then be specifically defined in the appended claim.

Example I

[1:2   f=100 mm.]

Figure 1:
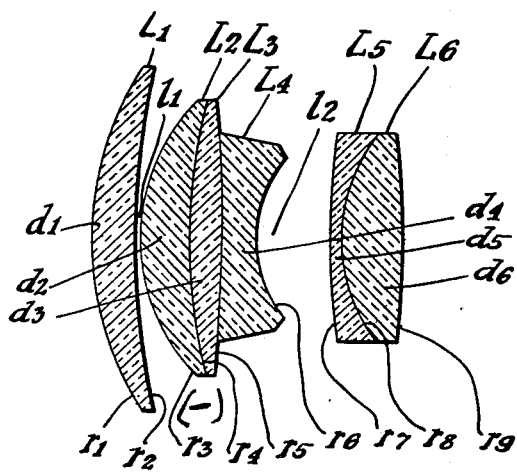
Fig. 1 illustrates diagrammatically one objective system arranged according to my invention.
Figure 2:
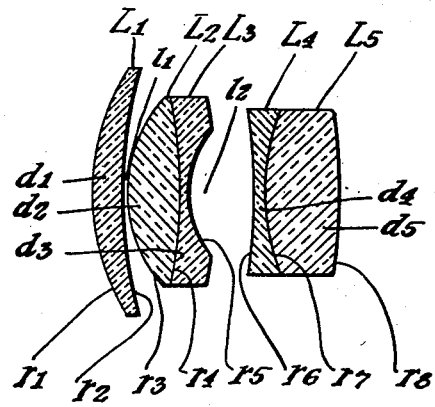
Fig. 2 illustrates diagrammatically another objective system.

|   |   |   | $n_D$ | $v$ |
|---|---|---|---|---|
| $r_1$ +57,00 | $d_1$ | 8,0 | 1,6185 | 60,5 |
| $r_2$ +146,30 | $l_1$ | 0,4 | | |
| $r_3$ +36,20 | $d_2$ | 10,0 | 1,6711 | 47,3 |
| $r_4$ +110,00 | $d_3$ | 6,0 | 1,4645 | 65,7 |
| $r_5$ −300,00 | $d_4$ | 6,8 | 1,6390 | 31,2 |
| $r_6$ +23,70 | $l_2$ | 15,0 | | |
| $r_7$ +200,00 | $d_5$ | 2,0 | 1,5647 | 55,8 |
| $r_8$ +30,70 | $d_6$ | 12,0 | 1,6711 | 47,3 |
| $r_9$ −152,64 | | | | |

Example II

[1:2,8   f=100 mm.]

|   |   |   | $n_D$ | $v$ |
|---|---|---|---|---|
| $r_1$ +43,50 | $d_1$ | 7,00 | 1,6711 | 47,3 |
| $r_2$ +94,88 | $l_1$ | 0,40 | | |
| $r_3$ +24,92 | $d_2$ | 10,60 | 1,5400 | 59,6 |
| $r_4$ −162,90 | $d_3$ | 1,40 | 1,6398 | 34,6 |
| $r_5$ +19,10 | $l_2$ | 13,20 | | |
| $r_6$ −242,84 | $d_4$ | 2,00 | 1,4645 | 65,7 |
| $r_7$ +37,12 | $d_5$ | 15,10 | 1,6711 | 47,3 |
| $r_8$ −138,30 | | | | |

It will be understood that I have disclosed the preferred forms of my invention only as some examples of the many possible ways to practically construct my objective systems and that I may make such changes therein as come within the scope of my invention without departure from the spirit of my invention and the principles involved.

Having thus described my invention, what I claim as new and desire to secure by Letters Patent is:

A photographic objective, consisting of three air-spaced glass members, of which the first glass member located opposite the object to be photographed has a positive refractive power, the second glass member located in the middle of the objective has a strongly curved meniscus shape, and the third glass member located opposite the light-sensitive material has a positive refractive power and consists of at least two lenses, of which the lens facing the light-sensitive material is a collecting one and the other lens is a dispersing one and has a refractive index smaller than that of the collecting lens, both lenses being cemented together in such a way that the cement forms a part facing with its hollow face the light-sensitive material.

LUDWIG BERTELE.